US012517653B2

(12) United States Patent
Nakano et al.

(10) Patent No.: US 12,517,653 B2
(45) Date of Patent: Jan. 6, 2026

(54) MANAGEMENT SYSTEM AND MANAGEMENT METHOD FOR DETERMINING INPUT/OUTPUT PERFORMANCE LIMITS IN DISTRIBUTED STORAGE SYSTEMS

(71) Applicant: Hitachi Vantara, Ltd., Yokohama (JP)

(72) Inventors: Kaori Nakano, Tokyo (JP); Shinichi Hayashi, Tokyo (JP)

(73) Assignee: Hitachi Vantara, Ltd., Yokohama (JP)

( * ) Notice: Subject to any disclaimer, the term of this patent is extended or adjusted under 35 U.S.C. 154(b) by 0 days.

(21) Appl. No.: 18/824,645

(22) Filed: Sep. 4, 2024

(65) Prior Publication Data

US 2025/0258599 A1 Aug. 14, 2025

(30) Foreign Application Priority Data

Feb. 14, 2024 (JP) .................................. 2024-020456

(51) Int. Cl.
*G06F 3/06* (2006.01)

(52) U.S. Cl.
CPC ............ *G06F 3/0604* (2013.01); *G06F 3/065* (2013.01); *G06F 3/0653* (2013.01); *G06F 3/0679* (2013.01)

(58) Field of Classification Search
CPC ....................................................... G06F 3/06
See application file for complete search history.

(56) References Cited

U.S. PATENT DOCUMENTS

| 8,589,550 B1 * | 11/2013 | Faibish | ................. | G06F 3/0662 |
| | | | | 709/225 |
| 9,971,548 B1 * | 5/2018 | Talwar | .................. | G06F 3/0613 |
| 2021/0286641 A1 | 9/2021 | Matsuda et al. | | |
| 2023/0185632 A1 * | 6/2023 | Iwasaki | ................. | G06F 9/5083 |
| | | | | 718/105 |

FOREIGN PATENT DOCUMENTS

JP 2021-144662 A 9/2021

* cited by examiner

*Primary Examiner* — Khoa D Doan
(74) *Attorney, Agent, or Firm* — PROCOPIO, CORY, HARGREAVES & SAVITCH LLP

(57) ABSTRACT

A management system shortens the length of time required for data copy while reducing its effects on other processes. The management system manages a storage system including a plurality of nodes. The management system references data copy information, application information, and volume information to identify a target node offering a target volume for a data copy process. The management system determines an available input/output performance value of the target node on the basis of node performance information and monitoring information. The management system determines an upper input/output performance limit of the data copy process on the basis of the available input/output performance value of the target node.

17 Claims, 13 Drawing Sheets

FIG. 3

| STORAGE CLUSTER ID | NODE ID | RANDOM READ MAXIMUM PERFORMANCE (IOPS) | RANDOM WRITE MAXIMUM PERFORMANCE (IOPS) | SEQUENTIAL READ MAXIMUM PERFORMANCE (MB/s) | SEQUENTIAL WRITE MAXIMUM PERFORMANCE (MB/s) |
|---|---|---|---|---|---|
| 111111 | NODE1 | 10000 | 10000 | 1000 | 1000 |
| 111111 | NODE2 | 10000 | 10000 | 1000 | 1000 |
| 111111 | NODE3 | 10000 | 10000 | 1000 | 1000 |
| 222222 | NODE1 | 10000 | 10000 | 1000 | 1000 |
| 222222 | NODE2 | 10000 | 10000 | 1000 | 1000 |
| 222222 | NODE3 | 10000 | 10000 | 1000 | 1000 |
| ... | ... | ... | ... | ... | ... |

MANAGEMENT TARGET STORAGE CLUSTER INFORMATION

| LOGICAL VOLUME ID (211) | STORAGE CLUSTER ID (212) | NODE ID (213) |
|---|---|---|
| VOL1 | 111111 | NODE1 |
| ... | ... | ... |
| ... | ... | ... |
| ... | ... | ... |
| ... | ... | ... |
| ... | ... | ... |
| ... | ... | ... |

MANAGEMENT TARGET VOLUME INFORMATION

| SNAPSHOT ID (221) | COPY SOURCE LOGICAL VOLUME/SNAPSHOT ID (222) |
|---|---|
| SS1 | VOL1 |
| SS2 | SS1 |
| ... | ... |
| ... | ... |
| ... | ... |
| ... | ... |
| ... | ... |

MANAGEMENT TARGET SNAPSHOT INFORMATION

F I G. 6

| TIME | READ IOPS | WRITE IOPS | READ THROUGHPUT (MB/s) | WRITE THROUGHPUT (MB/s) | STORAGE CLUSTER ID | NODE ID | AVAILABLE READ THROUGHPUT |
|---|---|---|---|---|---|---|---|
| 2023/01/01 0:00 | 2000 | 300 | 128 | 20 | f11111 | NODE1 | 852 |
| 2023/01/01 0:00 | ... | ... | ... | ... | f11111 | NODE2 | ... |
| ... | ... | ... | ... | ... | ... | ... | ... |
| 2023/01/01 0:01 | ... | ... | ... | ... | ... | ... | ... |
| ... | ... | ... | ... | ... | ... | ... | ... |
| ... | ... | ... | ... | ... | ... | ... | ... |

230

231 232 233 234 235 236 237 238

MANAGEMENT TARGET STORAGE MONITORING INFORMATION

| SERVER ID (241) | APPLICATION ID (242) | LOGICAL VOLUME ID (243) |
|---|---|---|
| SERVER1 | DB1 | VOL1,VOL2,VOL3 |
| SERVER1 | DB2 | VOL4,VOL5 |
|  |  |  |
|  |  |  |
|  |  |  |
| ... | ... | ... |

MANAGEMENT TARGET APPLICATION SERVER CONFIGURATION INFORMATION

| COPY PROCESS ID (251) | EXECUTION START TIME (252) | TARGET APPLICATION ID (253) |
|---|---|---|
| COPYPROC1 | EVERY MONDAY AT 0:00 | DB1 |
| COPYPROC2 | EVERY DAY AT 2:00 | DB5 |
|  |  |  |
|  |  |  |
|  |  |  |
| ... | ... | ... |

MANAGEMENT TARGET DATA COPY PROCESS CONFIGURATION INFORMATION

MANAGEMENT SYSTEM AND MANAGEMENT METHOD FOR DETERMINING INPUT/OUTPUT PERFORMANCE LIMITS IN DISTRIBUTED STORAGE SYSTEMS

CLAIM OF PRIORITY

The present application claims priority from Japanese patent application JP 2024-020456 filed on Feb. 14, 2024, the content of which is hereby incorporated by reference into this application.

BACKGROUND OF THE INVENTION

1. Field of the Invention

The present invention relates to management of a storage system.

2. Description of the Related Art

There exist distributed storage systems operating in a cloud or an on-premises environment, with a plurality of general-purpose servers clustered into a single storage function. There are also growing cases of secondary use of data in which parts of the data in the system are copied for analysis purposes, for example. In order to reduce the effects of data access for secondary use on the production system, it is necessary in some cases to impose input/output (I/O) performance limits on data copy.

As a background art of the present disclosure, there has been proposed JP-2021-144662-A. This publication discloses that, in order to reduce the effects of data copy for migration of a virtual machine on performance degradation of the virtual machines not targeted for migration, an available input/output-operations-per-second (IOPS) value of a migration source storage apparatus or the available IOPS value of a migration destination storage apparatus, whichever is the smaller, is set as a quality-of-service (QOS) value for the data copy.

SUMMARY OF THE INVENTION

The distributed storage system is a storage system constituted by a plurality of nodes. In order to implement a necessary function, volumes are thus created in a plurality of nodes and bundled into a single volume for presentation to a host. In this case, the pieces of data of one application (e.g., database) are distributed in the plurality of nodes. In the distributed storage system, data copy is required to be completed at the highest possible speed on condition that an upper performance limit of each node is not to be exceeded.

According to one embodiment of the present invention, there is provided a management system for managing a storage system. The management system includes at least one processor and at least one storage apparatus. The storage system includes a plurality of nodes. The at least one storage apparatus holds node performance information representing information regarding maximum performance of each of the plurality of nodes, volume information representing information regarding a volume provided by each of the plurality of nodes, monitoring information representing information regarding a load of each of the plurality of nodes, application information representing information regarding an application for accessing the volume, and data copy process information representing relations between the application and a data copy process. The at least one processor references the data copy process information, the application information, and the volume information to identify a target node providing a target volume for the data copy process. The at least one processor determines an available IO performance value of the target node on the basis of the node performance information and the monitoring information. The at least one processor also determines an upper IO performance limit of the data copy process on the basis of the available IO performance value of the target node.

The above embodiment of the present invention makes it possible to shorten the length of time required for data copy while reducing the effects of the data copy on other processes.

BRIEF DESCRIPTION OF THE DRAWINGS

FIG. 3 indicates an exemplary configuration of management target storage cluster information;

FIG. 4 indicates an exemplary configuration of management target volume information;

FIG. 5 indicates an exemplary configuration of management target snapshot information;

FIG. 6 indicates an exemplary configuration of management target storage monitoring information;

FIG. 7 indicates an exemplary configuration of management target application server configuration information;

FIG. 8 indicates an exemplary configuration of management target data copy process configuration information;

DESCRIPTION OF THE PREFERRED EMBODIMENTS

In the description that follows, the preferred embodiment may be explained in a plurality of sections or examples as needed. These sections or examples are related to each other and are variable of, explanatory of, or complementary to part or all of one another unless specified otherwise. In the ensuing description, references to the numerical aspects of the constituent elements of the embodiment (including quantities, values, amounts, and ranges) denote not definitive numbers but merely examples and are not limitative of the embodiment unless specified otherwise or unless the numbers are obviously determined theoretically.

A computer system may be configured by one or a plurality of computers that can communicate with each other. A computer apparatus, a computer system, or a group of computing resources includes at least one interface apparatus (e.g., including a communication apparatus and an I/O apparatus), at least one storage apparatus (e.g., including a memory (main storage) and an auxiliary storage apparatus), and at least one processor.

In the case where functions are implemented by programs executed by the processor, predetermined processes are carried out by use of the storage apparatus and/or the interface apparatus as needed. For this reason, such functions may be implemented at least as part of the processor. A process explained with a function as its subject may be considered to be performed by the processor or by a system that includes the processor.

The programs may be installed from a program source. The program source, for example, may be a program distribution server or a computer-readable storage medium (e.g., computer-readable non-transitory storage medium). The ensuing explanations of each function are only examples. A plurality of functions may be combined into a single function, and one function may be divided into a plurality of functions.

One embodiment of the present specification manages data copy of a storage system that includes a plurality of storage nodes. A management system as one embodiment of this specification references load information (performance information) and upper performance limit information regarding storage nodes to calculate an I/O performance value available for data copy in each storage node. The management system further holds information regarding the storage nodes in which the volumes targeted for data copy are arranged. The management system determines an upper I/O performance limit of data copy on the basis of the available I/O performance values of the storage nodes and the arrangement of the volumes targeted for data copy. According to one embodiment of this specification, it is possible to shorten the length of time required for data copy while reducing the effects, on the production environment, of the data copy of which the purposes are different from the purpose of the production environment.

First Embodiment

Figure 1:
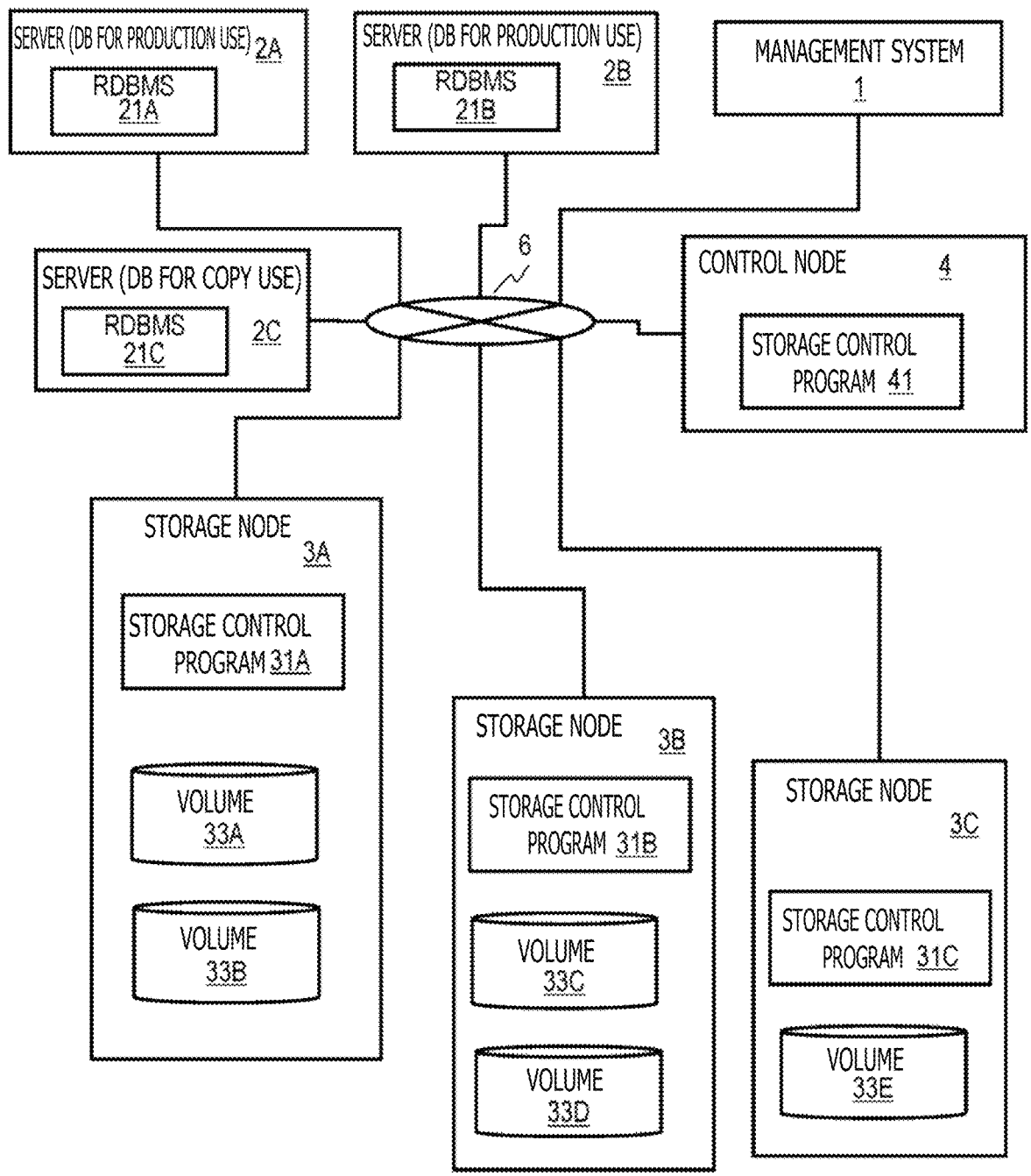
FIG. 1 depicts an exemplary configuration of a computer system as one embodiment of the present specification.

FIG. 1 depicts an exemplary configuration of a computer system as one embodiment of the present specification. The computer system includes a distributed storage system (also simply referred to as the storage system) that includes a plurality of storage nodes 3A, 3B, and 3C (also simply referred to as the nodes), and a plurality of servers 2A, 2B, and 2C that access the storage system for data storage. The servers 2A, 2B, and 2C can write data to the storage nodes 3A, 3B, and 3C and read the stored data therefrom via a network 6.

In the exemplary configuration in FIG. 1, the servers 2A, 2B, and 2C run relational database management systems (RDBMS) 21A, 21B, and 21C, respectively.

The RDBMS 21A and 21B of the servers 2A and 2B constitute a production-environment system (production system) that stores data into logical volumes (also simply referred to as the volumes where appropriate) offered by the storage system and reads data from the logical volumes. The RDBMS 21C of the server 2C copies data from the production environment for such purposes as secondary use (e.g., analysis), backup, and migration of production-environment data, which are different from the purpose of the proper operation. For example, the production-environment data may be copied from logical volumes of the production environment or may make use of snapshot volumes generated from the logical volumes.

The storage nodes 3A, 3B, and 3C constitute a single storage cluster (also simply referred to as the cluster) that functions as one storage system for a higher-level apparatus. A control node 4 controls the entire cluster. There may be any number of nodes that make up one cluster. Also, there may be configurations in which there is no dedicated control node 4.

The storage nodes 3A, 3B, and 3C execute storage control programs 31A, 31B, and 31C, respectively. The control node 4 executes a storage control program 41. The storage control programs 31A, 31B, 31C, and 41 carry out processes needed for the plurality of storage nodes 3A, 3B, and 3C to operate as a single storage system.

Constituted by a plurality of nodes, the storage system of this example generates logical volumes in a plurality of storage nodes to achieve necessary I/O performance. The storage system bundles the generated logical volumes into a single drive for presentation to higher-level apparatuses (servers). That is, in the production environment, the RDBMS 21 gain access to a plurality of logical volumes distributed in a plurality of storage nodes.

In the exemplary configuration in FIG. 1, the storage node 3A offers two logical volumes 33A and 33B to the servers 2A, 2B, and 2C. The storage node 3B offers two logical volumes 33C and 33D to the servers 2A, 2B, and 2C. The storage node 3C offers one logical volume 33E to the servers 2A, 2B, and 2C. Each storage node may generate snapshot volumes in addition to the logical volumes and offer the generated snapshot volumes to the servers.

The nodes 3A, 3B, 3C, and 3D are physical or virtual nodes. The storage nodes 3A, 3B, and 3C offer the volumes to the servers (higher-level apparatus). In response to I/O requests from the higher-level apparatus, the storage nodes 3A, 3B and 3C store the data received from the higher-level apparatus into logical volumes under management and reads data from logical volumes for transmission to the higher-level apparatus. The nodes 3A, 3B, 3C and 4 can communicate data with other nodes via the network 6 or some other network, not depicted in FIG. 1.

A management system 1 manages the computer system as a whole. The management system 1 can communicate with the servers 2A, 2B, and 2C and with the nodes 3A, 3B, 3C, and 4 via the network 6.

Figure 2:
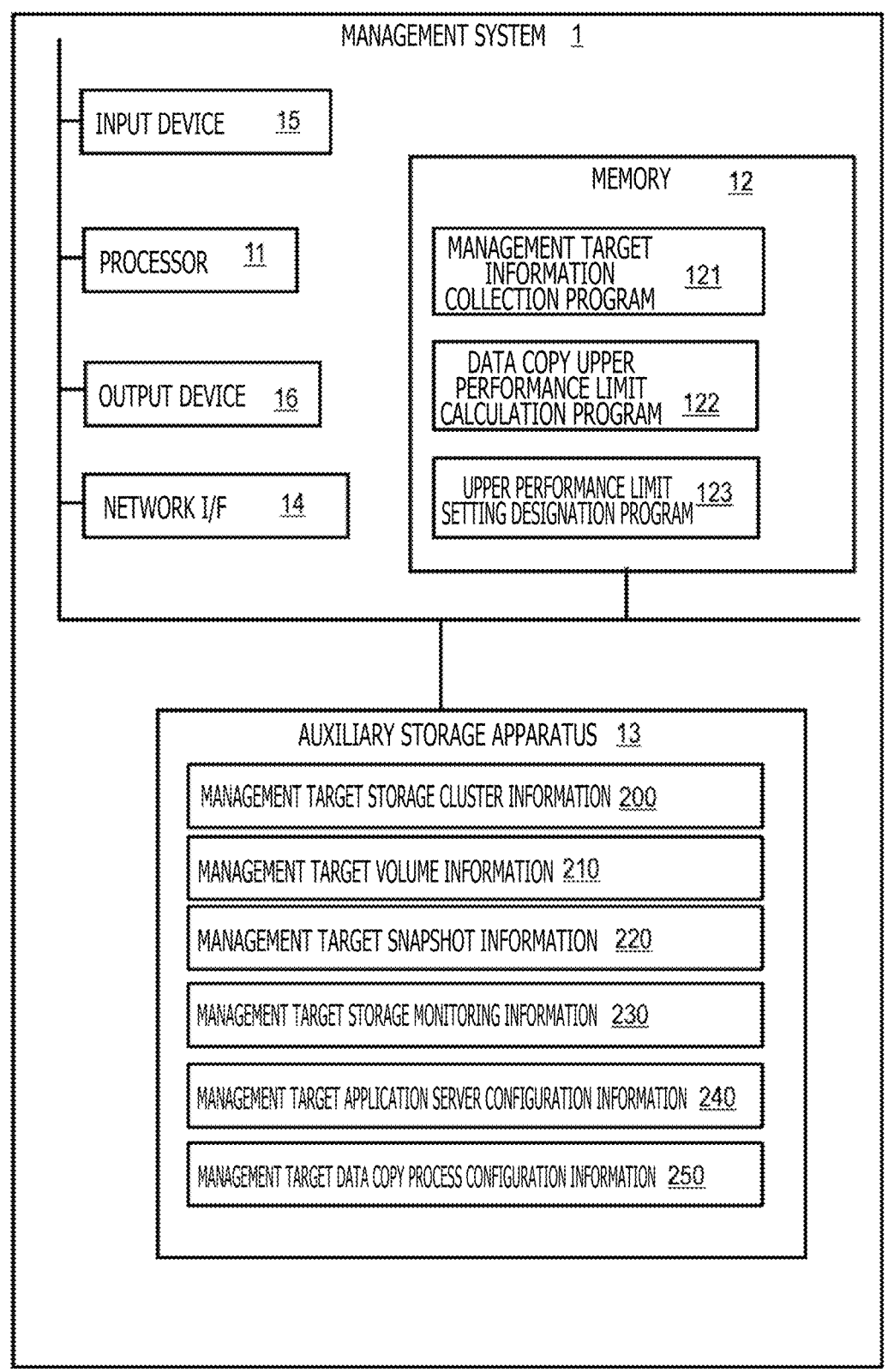
FIG. 2 depicts a configuration of a management system.

FIG. 2 depicts a configuration of the management system 1. The management system 1 may be configured by one or a plurality of computers. FIG. 2 indicates an exemplary configuration of a single computer. Specifically, the management system 1 includes a processor 11, a memory 12, an auxiliary storage apparatus 13, a network interface 14, an input device 15, and an output device 16. These constituent elements can communicate with each other via a bus.

The processor 11 may be a central processing unit (CPU), for example, which performs various processes and arithmetic operations and controls the entire apparatus. The memory 12 is a main storage apparatus including a volatile storage medium that holds the programs to be executed by the processor 11 and the data referenced or calculated by the processor 11. The auxiliary storage apparatus 13 includes a nonvolatile storage medium such as a hard disk drive or a solid-state drive (SSD) that holds various programs and data.

The network interface 14 is a communication apparatus for communicating with other apparatuses via the network 6. The input device 15 is a device through which a user inputs data to the management system 1. The input device 15 may include a keyboard, a mouse pointer, and a microphone. The output device 16 is a device that presents the user with information. The output device 16 may include a display apparatus and a printer. Some of the constituent elements such as the input device 15 and the output device 16 may be omitted, and other constituent elements may be added.

The processor 11 implements various processing parts by loading various programs into the memory 12 from the auxiliary storage apparatus 13 and carrying out the loaded predetermined programs. The predetermined programs for implementing the diverse processing parts may be stored beforehand in the auxiliary storage apparatus 13, retrieved from a portable non-temporary storage medium, or downloaded as needed from another apparatus connected to the network interface 14 before being stored into the auxiliary storage apparatus 13.

In the exemplary configuration in FIG. 2, the memory 12 holds a management target information collection program 121, a data copy upper performance limit calculation program 122, and an upper performance limit setting designation program 123. The auxiliary storage apparatus 13 holds management target storage cluster information 200, management target volume information 210, management target snapshot information 220, management target storage monitoring information 230, management target application server configuration information 240, and management target data copy process configuration information 250.

The servers 2A, 2B, and 2C may have the hardware configuration described above with reference to FIG. 2. Some constituent elements such as the input device 15 and the output device 16 may be omitted, and other constituent elements may be added. As discussed above, the processors of the servers run the RDBMS.

The storage nodes 3A, 3B, and 3C and the control node 4 may have the hardware configuration described above with reference to FIG. 2. As discussed above, the processors of the nodes execute the storage control programs. Some constituent elements such as the input device 15 and the output device 16 may be omitted, and other constituent elements may be added. The storage nodes 3A, 3B, and 3C include a plurality of storage drives (auxiliary storage apparatuses) that hold volume data. The storage drives may each be a hard disk drive or a solid-state drive, for example. The storage nodes 3A, 3B, and 3C relate the storage regions of a plurality of storage drives to volume addresses for management.

In the manner described above, the storage nodes 3A, 3B, and 3C and the control node 4 are configured by computers (servers) in the on-premises environment. In another example, the storage nodes 3A, 3B, and 3C and the control node 4 may be configured in a public cloud environment. That is, the storage nodes 3A, 3B, and 3C and the control node 4 may each be a virtual machine. A node as a virtual machine connects to a virtual drive via a network, not depicted.

What follows is a detailed explanation of the information held by the management system 1. FIG. 3 indicates an exemplary configuration of the management target storage cluster information 200. The management target storage cluster information 200 manages information regarding each of the storage clusters (distributed storage systems) under management. More specifically, the management target storage cluster information 200 manages information regarding the nodes making up each storage cluster as well as information regarding the maximum performance of each of the nodes. The management target storage cluster information 200 is node performance information indicative of the maximum performance of the nodes.

In the exemplary configuration in FIG. 3, the management target storage cluster information 200 includes a storage cluster ID field 201, a node ID field 202, a random read maximum performance field 203, a random write maximum performance field 204, a sequential read maximum performance field 205, and a sequential write maximum performance field 206.

The storage cluster ID field 201 indicates the IDs each identifying each of the storage clusters under management. The node ID field 202 indicates the IDs each identifying each of the nodes making up each of the storage clusters. A node ID uniquely identifies a node in each storage cluster. Throughout the entire system, the combination of a storage cluster ID and a node ID uniquely identify each node. The nodes included in the clusters are either physical nodes or virtual nodes.

The random read maximum performance field 203 indicates random read maximum performance of each node. In this example, the random read performance is represented by IOPS. The random write maximum performance field 204 indicates random write maximum performance of each node. In this example, the random write performance is represented by IOPS.

The sequential read maximum performance field 205 indicates sequential read maximum performance of each node. In this example, the sequential read performance is represented by throughput (megabytes per second (MB/s)). The sequential write maximum performance field 206 indicates sequential write maximum performance of each node. In this example, the sequential write performance is represented by throughput (MB/s).

FIG. 4 indicates an exemplary configuration of the management target volume information 210. The management target volume information 210 manages information regarding the logical volumes offered to the higher-level apparatus by each of the storage clusters under management. More specifically, the management target volume information 210 manages information regarding the nodes that offer and manage each of the logical volumes. Such logical volumes may simply be referred to as the volumes.

In the exemplary configuration in FIG. 4, the management target volume information 210 includes a volume ID field 211, a storage cluster ID field 212, and a node ID field 213. The volume ID field 211 indicates the IDs each uniquely identifying each volume in the storage system. The storage cluster ID field 212 indicates the IDs of the storage clusters offering and managing the volumes, and the node ID field 213 indicates the IDs of the nodes in a given storage cluster.

FIG. 5 indicates an exemplary configuration of the management target snapshot information 220. The management target snapshot information 220 is volume information for managing the information regarding snapshot volumes generated and managed by each of the storage clusters under management. More specifically, the management target snapshot information 220 manages the relations between the snapshot volumes and the copy sources (generation sources). A snapshot volume is a kind of volume, which is simply referred to as a snapshot.

In the exemplary configuration in FIG. 5, the management target snapshot information 220 includes a snapshot ID field 221 and a copy source volume/snapshot ID field 222. The snapshot ID field 221 indicates the IDs each uniquely identifying each of the snapshots under management. The copy source volume/snapshot ID field 222 indicates the IDs each identifying either a volume as the copy source of a snapshot or a snapshot. In this example, each snapshot may be generated from a single logical volume or a single snapshot. Each snapshot is generated and managed by the same node as that of the copy source.

FIG. 6 indicates an exemplary configuration of the management target storage monitoring information 230. The management target storage monitoring information 230 manages the monitored performance (load) of the storage system under monitoring. Specifically, the management target storage monitoring information 230 manages a performance history (load history) of each node under monitoring. Each row in the table indicates the monitored performance of each node at a given point in time. The management target information collection program 121 periodically collects performance information regarding the nodes under management, and updates the management target storage monitoring information 230 accordingly.

In the exemplary configuration in FIG. 6, the management target storage monitoring information 230 includes a time field 231, a read IOPS field 232, a write IOPS field 233, a read throughput field 234, a write throughput field 235, a storage cluster ID field 236, a node ID field 237, and an available read throughput field 238.

The time field 231 indicates monitoring times. The read IOPS field 232 indicates the IOPS carried out in response to read requests. The write IOPS field 233 indicates the IOPS carried out in response to write requests. The read throughput field 234 indicates the throughput given in response to read requests. The write throughput field 235 indicates the throughput given in response to write requests. The storage cluster ID field 236 indicates the IDs each identifying the cluster to which each node belongs. The node ID field 237 indicates the IDs of the nodes. The available read throughput field 238 indicates the read throughput (I/O performance) of the nodes available for data copy. A method of calculating the available read throughput will be discussed later.

FIG. 7 indicates an exemplary configuration of the management target application server configuration information 240. The management target application server configuration information 240 manages information regarding the applications gaining access to the storage system. In this example, the applications are all assumed to be databases. More specifically, the management target application server configuration information 240 manages information regarding the servers executing the applications and the volumes accessed by the applications.

In the exemplary configuration in FIG. 7, the management target application server configuration information 240 includes a server ID field 241, an application ID field 242, and a volume ID field 243. The server ID field 241 indicates the IDs each identifying the server executing an application. The servers may be physical or virtual servers. The application ID field 242 indicates the IDs each identifying the application that uses the storage system. The volume ID field 243 indicates IDs identifying the volumes used by each application.

FIG. 8 indicates an exemplary configuration of the management target data copy process configuration information 250. The management target data copy process configuration information 250 manages the copy processes performed by the storage system. More specifically, the management target data copy process configuration information 250 manages the schedule of the copy processes and the applications targeted for copy. The copy processes registered in the management target data copy process configuration information 250 are for such purposes as secondary use and backup, which are different from of the purpose of the proper operation (purpose in the production environment).

In the exemplary configuration in FIG. 8, the management target data copy process configuration information 250 includes a copy process ID field 251, an execution start time field 252, and a target application ID field 253. The copy process ID field 251 indicates the IDs of copy processes. The execution start time field 252 indicates the start time of each copy process. The execution start time field 252 may indicate the date and time of a periodical copy process or the date and time of a one-shot copy process. The execution start time field 252 may also indicate immediate execution of a copy process. The target application ID field 253 indicates the IDs of copy target applications.

Figure 9:
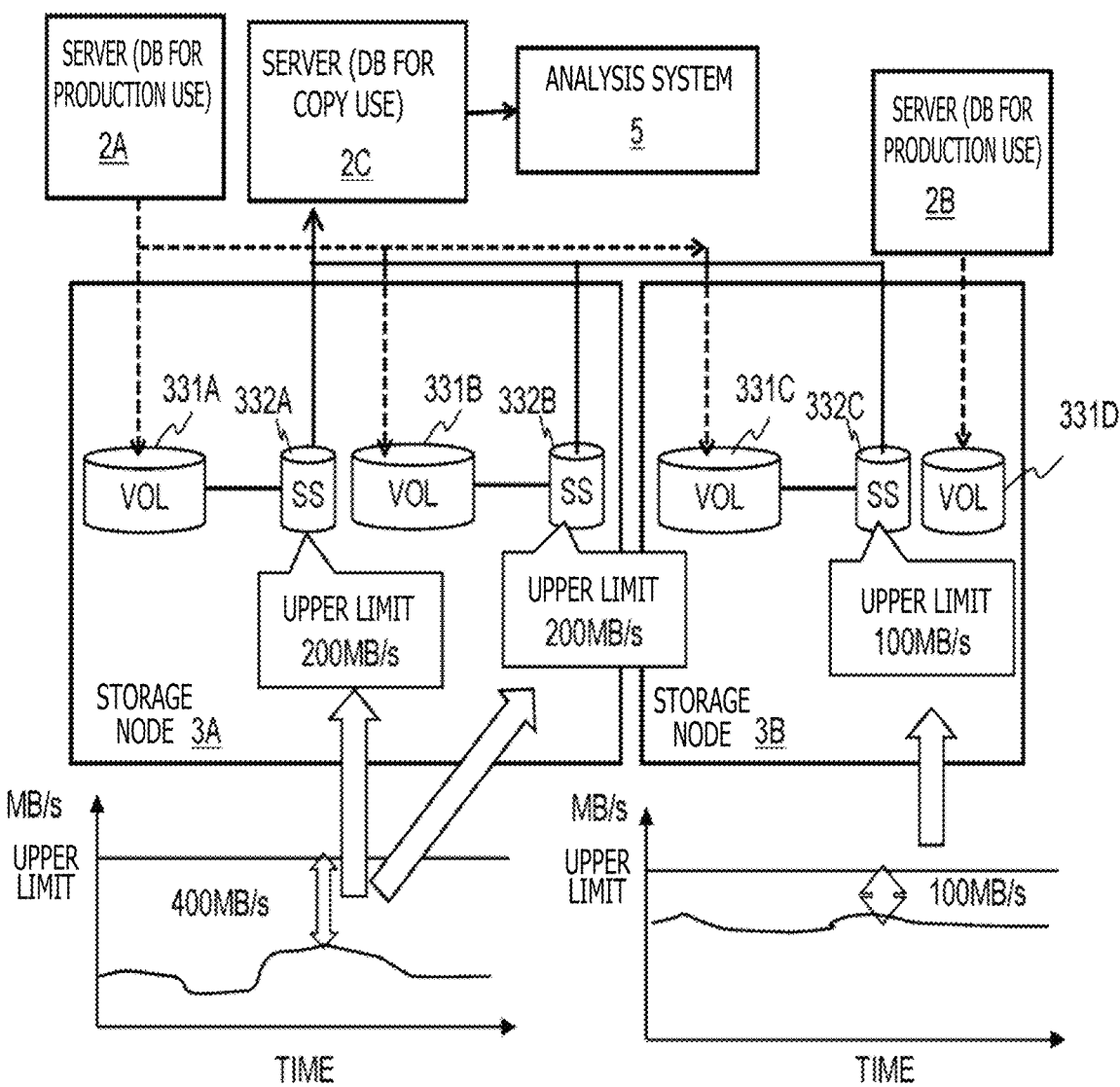
FIG. 9 is a diagram explaining how data copy is performed by the embodiment of the present specification.

What follows is an explanation of a method of managing and controlling the data copy (data read) from volumes (including logical volumes and snapshots) in the storage system in an embodiment of the present specification. FIG. 9 is a diagram explaining how data copy is performed by one embodiment of the present specification.

The storage node 3A holds logical volumes 331A and 331B as well as snapshot 332A and 332B corresponding thereto. The storage node 3B holds logical volumes 331C and 331D as well as a snapshot 332C corresponding to the logical volume 331C. Here, a snapshot volume holds only the difference data of a given logical volume relative to the data thereof at a given point in time, and does not hold the whole volume data at that point in time.

The server 2A (RDBMS 21A) gains access to the logical volumes 331A, 331B and 331C in the production environment. That is, these three logical volumes are linked to one database application. The server 2B (RDBMS 21B) accesses the logical volume 331D. The logical volume 331D alone is linked to another database application.

The storage node 3A generates the snapshots 332A and 332B corresponding to the logical volumes 331A and 331B in the production system. The storage node 3B generates the snapshot 332C corresponding to the volume 331C in the production system.

In response to requests from an analysis system 5 for secondary use, the server 2C (RDBMS 21C) reads data from the snapshots 332A, 332B, and 332C and transmits copies of the retrieved data to the analysis system 5. That is, the server 2C reads the data from the storage nodes 3A and 3B. The analysis system 5 analyzes the received data.

As discussed above, a snapshot holds only the difference data relative to the copy source data. Hence, reading data from the snapshot entails reading data from the copy source volume. Consequently, the data read from the snapshot can affect the production environment.

The management system 1 imposes I/O limits on the data read via snapshots. For example, the management system 1 sets an upper I/O performance limit on the data read from each snapshot. The upper I/O performance limit may be set for a snapshot or for a copy source logical volume corresponding to the snapshot. Since the reading of data for data copy occurs as sequential read, the upper I/O performance limit may be set as the upper limit on the throughput (MB/s) including read and write or on the read throughput (MP/s), for example. This makes it possible to implement data read in a short period of time via snapshots while reducing the effects of the data read on the production environment.

In the exemplary configuration in FIG. 9, the plurality of snapshots 332A, 332B, and 332C are linked to one database application. The snapshots 332A, 332B, and 332C as well as the copy source volumes 331A, 331B, and 331C are stored distributed in the plurality of storage nodes 3A and 3B.

The management system 1 sets the upper I/O performance limit for each volume in such a manner that the upper performance limits of the plurality of access designation storage nodes 3A and 3B are not exceeded and that data read is completed in a short period of time. In the example of FIG. 9, the available I/O performance (I/O performance margin) of the storage node 3A is 400 MB/s, and the available I/O performance of the storage node 3B is 100 MB/s. The available I/O performance may be the difference between the upper I/O performance limit of a storage node on one hand and an average I/O performance value predicted over a predetermined time period from the start of copy (data read) on the other hand, for example.

The server 2C reads data via the two snapshots 332A and 332B in the storage node 3A. That is, the two snapshots 332A and 332B are simultaneously targeted for sequential read. Consequently, the available I//O performance of 400 MB/s of the storage node 3A is prorated between the two snapshots 332A and 332B. That is, the upper I/O performance limit for each of the snapshots 332A and 332B is set to 200 MB/s.

The server 2C reads data via one snapshot 332C in the storage node 3B. That is, the single snapshot 332C is targeted for sequential read. Consequently, the available I/O performance of 100 MB/s of the storage node 3B is allocated to the snapshot 332C. That is, the upper I/O performance limit for the snapshot 332C is set to 100 MB/s.

Data copy via snapshots involves copying not the whole data of a database but only portions of the data thereof. For example, this type of data copy may be used in the case where tables in a database are to be partially copied, for example.

Figure 10:
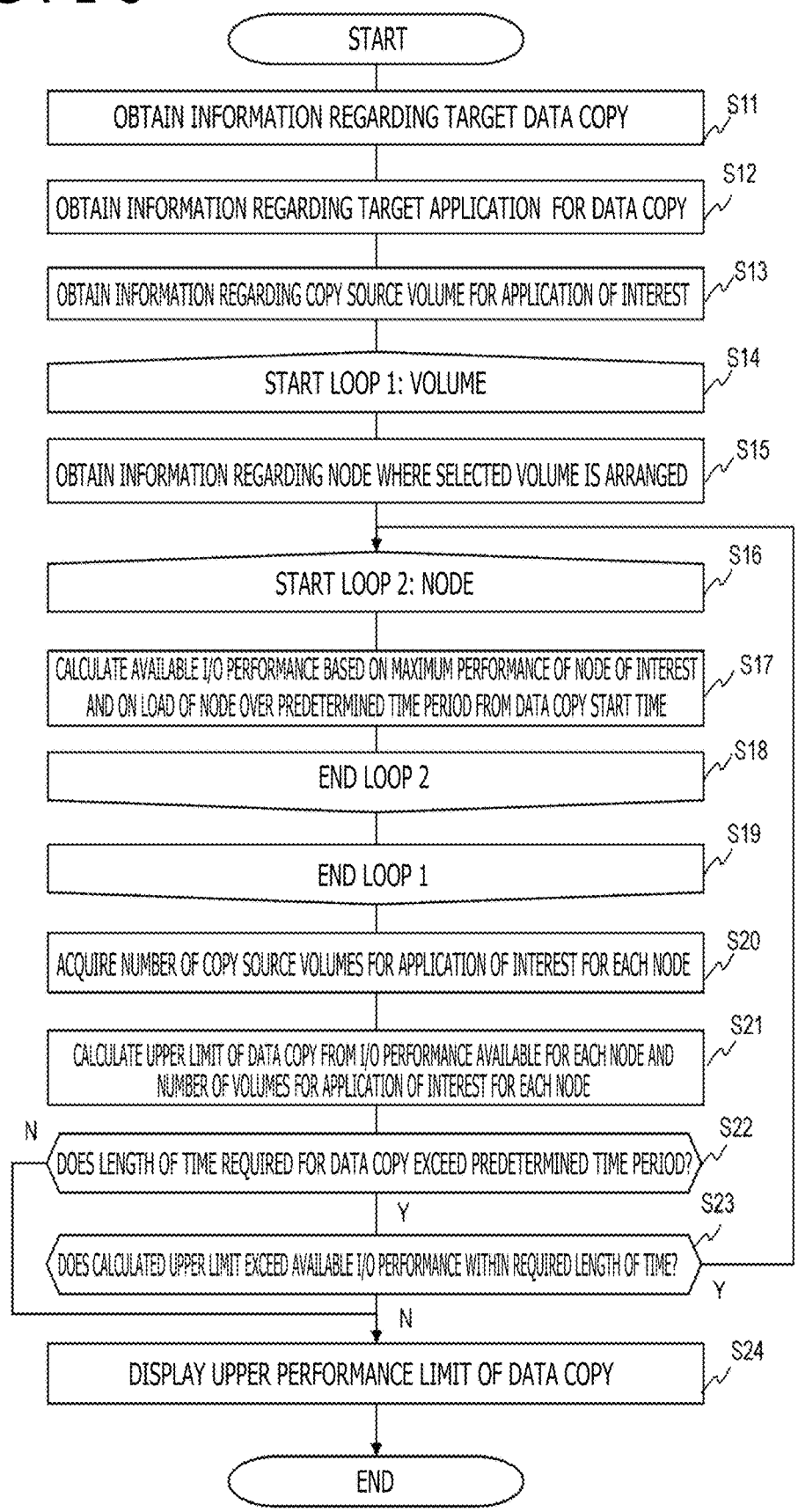
FIG. 10 is a flowchart indicating an exemplary process performed by the management system to determine an upper performance limit of data copy.

Below is an explanation of the process performed by the management system 1 to determine the upper performance limit of data copy. FIG. 10 is a flowchart indicating an exemplary process carried out by the management system 1 to determine the upper performance limit of data copy (data read).

This process flow is executed when, for example, a copy process record is additionally registered to the management target data copy process configuration information 250. Copy process information is registered when the copy process of the data in a designated production environment is determined to be performed. This copy process is for such purposes as secondary use and backup, which are different from the purpose of a proper business system. The copy process to be registered can be either a one-shot temporary copy process or a periodical copy process.

This process flow may be started in a periodically timed manner. In the case where the load of the production environment is changed, it is possible to periodically review the process flow. In another example, at the time when the load tendency of the production environment is detected to have changed significantly after the copy process has been set, the process flow may be started. The process flow may be started, for example, in the case where, in a given node, the amount of increase in all or a designated part of the pieces of performance information 232 to 235 in the management target storage monitoring information 230 exceeds a threshold value over a predetermined time period.

The data copy upper performance limit calculation program 122 first obtains information regarding the target data copy (S11), and further acquires information regarding the target application for the data copy (S12). The data copy upper performance limit calculation program 122 may obtain an execution start time of the target copy process and information regarding the target application from the management target data copy process configuration information 250.

The target data copy is contingent on what causes the process flow to start. For example, in the case where the process flow is periodically executed, all copy processes before the start of execution may be targeted. In the case where a new copy process is registered, the registered copy process alone may be targeted. In the case where the amount of load of a given node has sharply increased, the copy processes related to the logical volumes or snapshots of that node may be targeted.

The data copy upper performance limit calculation program 122 then obtains information regarding the copy source volume of data copy for the application of interest (S13). The copy target volume for the application may be a snapshot in the case where the volume is designated in management information, not indicated, or where snapshots exist. The copy target volume may be a logical volume in the case where snapshot volumes do not exist.

In the example of FIG. 9, the snapshot of the database application is the copy source volume. The data copy upper performance limit calculation program 122 may acquire information regarding the target logical volume for the application from the management target application server configuration information 240. The data copy upper performance limit calculation program 122 may further obtain information regarding the snapshot of the target logical volume of interest from the management target snapshot information 220. If the snapshot is the copy source volume, the information to be obtained here may be information regarding a logical volume.

A loop from step S14 to step S19 is repeatedly executed on each of the copy source volumes acquired in step S13. The data copy upper performance limit calculation program 122 selects one volume at a time from among the volumes obtained in step S13, and carries out steps S15 through S17 on each of the selected volumes.

In step S15, the data copy upper performance limit calculation program 122 obtains information regarding the node in which the selected volume is arranged. Specifically, in the case where the copy source is a snapshot, the data copy upper performance limit calculation program 122 can identify the copy source volume of the target snapshot by referencing the management target snapshot information 220, and identify the node holding the target snapshot by referencing the management target volume information 210. In the case where the copy source is a logical volume, the data copy upper performance limit calculation program 122 can reference the management target volume information 210 to identify the node holding the target logical volume.

A loop from step S16 to step S18 is carried out on each selected node. Specifically, the data copy upper performance limit calculation program 122 calculates the I/O performance available for data copy from the maximum performance of the selected node and the load of the node over a predetermined time period from the data copy start time (S17).

Maximum performance information regarding nodes can be obtained from the management target storage cluster information 200. The maximum performance of the nodes for sequential read is determined in a manner permitting sequential read from volumes for the data copy. The sequential read maximum performance field 205 of the management target storage cluster information 200 indicates the sequential read maximum performance of each node.

The load of a node over a predetermined time period from the data copy start time may be estimated on the basis of the management target storage monitoring information 230. The management target storage monitoring information 230 indicates the load history of each node. Here, the read throughput and the write throughput are referenced in order to estimate the node load. For example, the maximum value of the node load over a specific past period or 90 percent, (average+standard deviation), or (average+2*standard deviation) of the maximum value may be determined to be the estimated load over the predetermined time period from the data copy start time. The estimated load for the read throughput and the estimated load for the write throughput are separately calculated.

A specific past period may be determined according to the data copy start time. In the case where data copy is immediately executed, reference may be made to the load information regarding the specific past period starting from the present. In the case where the data copy start time is a specific time on a specific date in the future, reference may be made to the load information over a predetermined time period starting from a similar time on a similar date in the past such as the same time on the same date or the same time on a given date of the week.

Various methods may be used to calculate the I/O performance (MB/s) of the node available for data copy. In the case of a storage system that simply holds data on storage drives, the read performance is equal to the write performance. In this case, the maximum performance of sequential read and that of sequential write are the same. Consequently, the I/O performance (read throughput (MB/s)) of the node available for data copy may be calculated, for example, as follows: (maximum performance−(node load (read throughput)+node load (write throughput))).

At the time of data write, for example, when a storage operating system (OS) runs processes such as writing of data to a plurality of nodes in order to improve reliability, the necessary performance of data write is multiplied by a factor of "b." At the time of data read, when such processes are performed to improve reliability, the necessary performance of data read is multiplied by a factor of "a." Consequently, the maximum performance of sequential read is defined as T/a and the maximum performance of sequential write is given as T/b with respect to the total performance T of the hard disks involved. The factors "a" and "b" may each be a constant. The management target storage cluster information 200 may hold the T/a and T/b.

In a sequential process, for example, where a storage drive can constitute a bottleneck to a storage cluster and where the read throughput is R and the write throughput is W for the node, the available read throughput may be calculated as (T/a−(R+bW/A). This is only an example, and the calculation formula may vary from one storage system to another. For example, the factors "a" and "b" may be variables and not constants. The bottleneck may occur at a position different from the storage drives.

After performing a loop from step S14 to step S19 on all volumes and on all nodes of all volumes, the data copy upper performance limit calculation program 122 acquires the number of copy source volumes for data copy of the application of interest for each node (S20). This information is included in the copy source volume information acquired in step S13.

The data copy upper performance limit calculation program 122 then calculates the upper limit of data copy from the I/O performance available for each node and the number of copy source volumes for each node (S21). In this example, it is assumed that the upper performance limit can be set for each volume (for each snapshot). The upper limit of a volume "m" on a node "n" can be calculated by the following calculation formula:

Upper limit=(available I/O performance of node "n")/(number of copy source volumes on node "n")

The data copy upper performance limit calculation program 122 calculates the above value for each of the copy source volumes (snapshots) from which data is read for data copy. This calculation method yields more accurate values in the case where the data of one database application is distributed in a plurality of volumes and where data access to these volumes occurs in an approximately even manner. Alternatively, calculation formulas different from the above calculation formula may be used. For example, a calculation formula that takes the data arrangement in the volumes and the biased data access thereto into consideration may be adopted.

The data copy upper performance limit calculation program 122 then determines whether the length of time required for data copy exceeds a predetermined time period from the data copy start time in which the available I/O performance has been calculated in step S17 (S22). Alternatively, steps S22 and S23 may be omitted.

In step S17, as discussed above, the available I/O performance is calculated from the maximum performance of the node of interest and from the node load over the predetermined time period from the data copy start time. The predetermined time period is a fixed time period designated beforehand. In the case where the upper performance limit of data copy derived in step S21 is set, there may be cases where the data copy is processed beyond the predetermined time period. The data copy upper performance limit calculation program 122 checks to see that the maximum performance of the node is not exceeded after the predetermined time period from the data copy start time. This permits more appropriate data copy control.

The data copy upper performance limit calculation program 122 can estimate the length of time required for data copy by use of the following formula:

Required length of time=maximum (amount of volume copy data/upper limit setting)

In the case where the amount of data to be copied is included (i.e., known) in management information, that value constitutes the amount of copy data. In the case where the amount of data to be copied is unknown, the capacity of copy source volumes (maximum data amount) or the used amount of copy source volumes, each being included in the management information, may be used as the amount of copy data.

In the case where the length of time required for data copy does not exceed the predetermined time period (S22: N), the process flow goes to step S24. In the case where the length of time required for data copy exceeds the predetermined time period (S22: Y), the data copy upper performance limit calculation program 122 determines whether the upper limit calculated in step S21 exceeds the I/O performance available within the required length of time (S23). The data copy upper performance limit calculation program 122 calculates the available I/O performance for the period from the data copy start time to elapse of the required length of time. In the calculation formula, the predetermined time period may be replaced by the time required for data copy in the explanation of step S17.

In the case where the upper limit setting exceeds the recalculated available I/O performance (S23: Y), the data copy upper performance limit calculation program 122 repeats the process flow from step S16 assuming that the length of time required for data copy is equal to the predetermined time period. In the case where the upper limit setting does not exceed the recalculated available I/O performance (S23: N), the data copy upper performance limit calculation program 122 outputs the upper performance limit of data copy to the output device 16, such as a display apparatus for display (S24).

On the basis of the displayed information, an administrator (user) may set the upper performance limit for the storage system.

The upper performance limit setting designation program 123 receives the designated upper limit from the administrator via the input device 15, for example, and designates an upper performance limit setting of a volume, i.e., a logical volume or a snapshot, for the control node 4. Given the designation, the control node 4 sets the designated upper performance limit for the designated volume and performs control accordingly. This permits more appropriate data copy control.

Second Embodiment

Explained below is a second embodiment in which data is copied from volumes of a storage system including a plurality of storage nodes. The first embodiment involves copying data from snapshots for secondary uses. The second embodiment aims to suitably determine an upper I/O performance limit of data read for data backup. The flowchart in FIG. 10 can also be applied to the second embodiment. What makes the second embodiment different from the first embodiment is that the method used in the second embodiment for calculating the upper I/O performance limit of data copy in step S21 is different from the method in the first embodiment.

Figure 11:
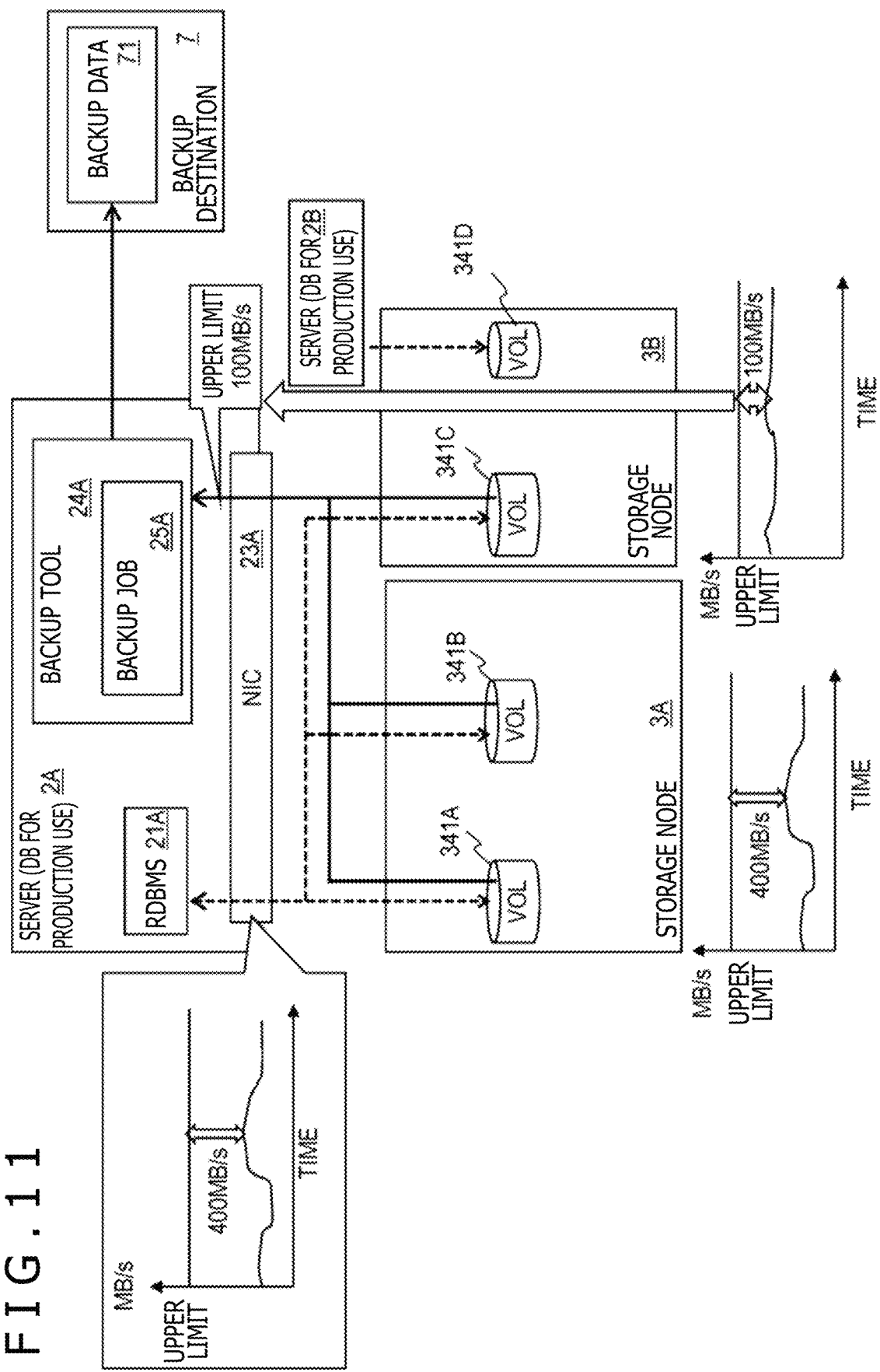
FIG. 11 is a diagram explaining how data copy is performed by another embodiment of the present specification.

FIG. 11 is a diagram explaining how data copy is performed by the second embodiment of the present specification. The storage node 3A holds logical volumes 341A and 341B. The storage node 3B holds logical volumes 341C and 341D.

The server 2A (RDBMS 21A) gains access to the logical volumes 341A, 341B and 341C in the production environment. That is, these three logical volumes are linked to one database application. The server 2B accesses the logical volume 341D. The logical volume 341D alone is linked to another database application.

Using a backup tool, the second embodiment copies data from logical volumes of the production system via a server. In the exemplary configuration in FIG. 11, the server 2A executes a backup tool (program) 24A. In response to instructions from the management system 1, the backup tool 24A controls the I/O limits on the storage system. The upper I/O performance limit based on the backup tool 24A is set in units of backup jobs 25A. The backup tool 24A controls data copy in units of servers.

The first embodiment sets upper I/O performance limits for individual volumes. The second embodiment determines an upper I/O performance limit for the storage system by a calculation method different from the calculation method explained in connection with the first embodiment. Specifically, the backup tool 24A calculates the upper limit for the backup job 25A by use of the following mathematical formula:

Minimum ($X$=available I/O performance of node "$n$"/number of copy source volumes on node "$n$")

That is, the management system 1 determines the smallest of the available I/O performance values of the copy source volumes to be the upper I/O performance limit. In the example of FIG. 11, the available I/O performance of the storage node 3A is 400 MB/s, and two logical volumes 341A and 341B constitute the data copy source volumes from which data is read. Consequently, the upper limit calculated from the storage node 3A alone is 200 MB/s.

The available I/O performance of the storage node 3B is 100 MB/s, and one logical volume 341C constitutes the data copy source volume from which data is read. Consequently, the upper limit calculated from the storage node 3B alone is 100 MB/s. Since the copy source storage nodes are these two storage nodes 3A and 3B, the smaller of their two upper limits, 100 MB/s, is determined to be the upper limit for the backup job 25A.

The data of the database is arranged distributed in a plurality of logical volumes. There may be cases where particular logical volumes are disproportionately accessed. The above calculation method involves setting the upper I/O performance limit for the backup job 25A in such a manner that the upper performance limit for the node will not be exceeded during data copy even if one logical volume alone is disproportionately accessed.

In determining the upper I/O performance limit of the backup job 25A, the data copy upper performance limit calculation program 122 may further reference the available I/O performance (bandwidth) of a network interface (network interface card (NIC)) 23A of the production server 2A. Specifically, the upper I/O performance limit of the backup job 25A may be determined by use of the following mathematical formula:

Minimum ($X$,$Y$=available bandwidth of NIC)

The available bandwidth of the NIC is calculated as follows: (maximum bandwidth of NIC-consumed bandwidth of NIC (predetermined time period from data copy start time).

In the case where the backup tool 24A is subject to I/O limits (under bandwidth control), the copied data passes via the server 2A of the production system. Consequently, data copy is controlled more appropriately when the upper I/O performance limit is determined in a manner including the I/O performance of the server 2A. For example, the data copy upper performance limit calculation program 122 sets the upper I/O performance limit in such a manner that the available I/O performance (bandwidth) of the network interface (NIC) 23A in the production server 2A will not be exceeded.

In the example of FIG. 11, the available I/O performance of the NIC 23A in the production server 2A is 400 MB/s. This value is larger than 100 MB/s, the smallest available I/O performance of the storage system. For this reason, the upper I/O performance limit for the backup job 25A is determined to be 100 MB/s. If the available I/O performance of the NIC is smaller than 100 MB/s, then the upper I/O performance limit for the backup job 25A is determined to be the available I/O performance of the NIC.

Backup data may be used not only for usual data protection purposes, i.e., for recovery of data in the production database, but also for secondary use and data migration purposes.

In the above example, in calculating the available I/O performance, the data copy upper performance limit calculation program 122 references the throughput of the storage system and the network interface bandwidth of the server. The data copy upper performance limit calculation program 122 may further reference the memory performance of the server.

There is a previously established calculation formula representing how much of the memory performance is consumed with respect to the sequential read throughput requested by the database beforehand. The upper I/O performance limit is determined from the smallest of the performance values representing the throughput of the storage system, the network interface bandwidth of the server, and the memory performance.

In the exemplary configuration in FIG. 11, backup data is transmitted to the backup destination via the server. In an alternative configuration example, backup data may be transmitted directly from the storage system to the backup destination without intervention of the server. In this alternative configuration, the upper I/O performance limit is determined for each storage node as discussed above in conjunction with the first embodiment.

If one of a plurality of storage nodes included in a cluster fails, the cluster provides a function to switch the access destination automatically to redundant data in volumes of another storage node. In the case where a storage drive of one storage node fails, there is provided a function to continue data services using the redundant data in another storage node.

The data copy upper performance limit calculation program 122 may set the upper limit for a job in a manner not exceeding the upper I/O performance limit of a storage node in which redundant volumes are arranged, by additionally calculating the I/O performance available for that storage node in consideration of the possible switching discussed above. This point also applies to the setting of the upper limit for the job and to the setting of the upper limit for the volume in other embodiments.

Third Embodiment

Explained below is a third embodiment in which data is copied from volumes in a storage system including a plurality of storage nodes. In the first embodiment, data from snapshots is copied to the outside of the storage system for secondary uses. The third embodiment involves copying backup data within the storage system. The third embodiment permits appropriate execution of data copy within the storage system without intervention of a server.

The flowchart in FIG. 10 may be applied to the third embodiment. The method of calculating the upper I/O performance limit in accordance with the third embodiment is similar to the calculation method of the first embodiment. The difference from the first embodiment is the target for which the upper I/O performance limit is set in the third embodiment. In the third embodiment, the upper I/O performance limit is set in units of storage nodes or volumes. The upper I/O performance limit is set for data copy within a storage node.

Data copy within a storage node entails data read from a storage drive and data write to another storage drive. For example, the smaller of the two available I/O performance values of the read throughput and write throughput, or designated one of these two values, may be selected as the upper copy performance limit inside a storage node. There may or may not be a distinction between read throughput and write throughput.

Figure 12:
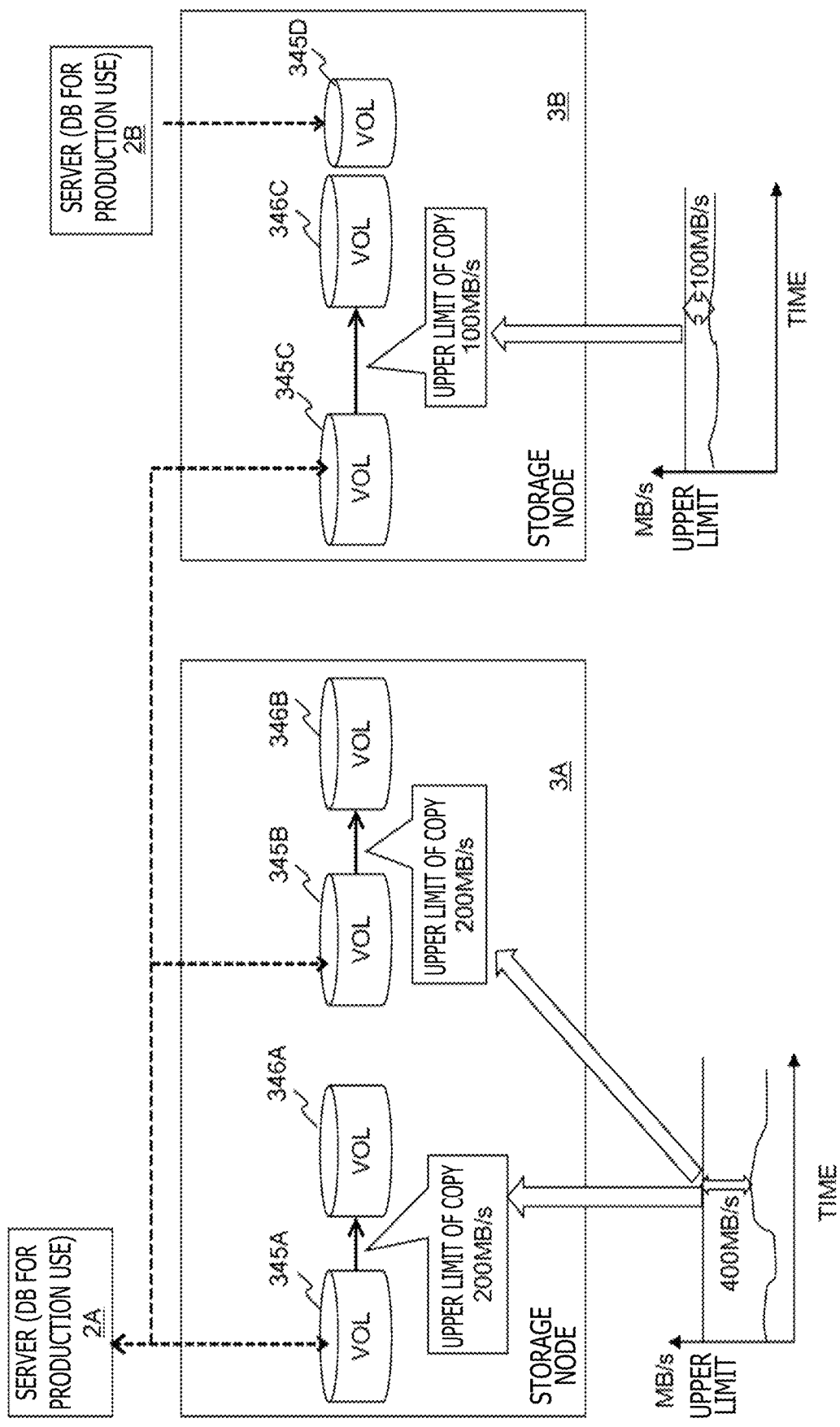
FIG. 12 is a diagram explaining how data copy is performed by another embodiment of the present specification.

FIG. 12 is a diagram explaining how data copy is performed by the third embodiment of the present specification. The storage node 3A holds logical volumes 345A and 345B. The storage node 3B holds logical volumes 345C and 345D. In the production environment, the server 2A gains access to the logical volumes 345A, 345B, and 345C. That is, these three logical volumes are linked to one database application. The server 2B accesses the logical volume 345D. The logical volume 345D alone is linked to another database application.

The storage node 3A generates copy volumes 346A and 346B corresponding to the logical volumes 345A and 345B of the production system. The storage node 3B generates a copy volume 346C corresponding to the logical volume 345C of the production system.

The management system 1 imposes limits on the storage nodes 3A and 3B. Here, the management system 1 sets upper I/O performance limits for data read from each logical volume of the copy source. As in the first embodiment, the upper limit of the throughput (MB/s) including read and write or the upper limit of the read throughput (MB/s) may be calculated as the upper I/O performance limit.

In the example of FIG. 12, the available I/O performance of the storage node 3A is 400 MB/s. The storage node 3A reads data from the two logical volumes 345A and 345B and writes the retrieved data to the two logical volumes 346A and 346B. That is, the two logical volumes 345A and 345B are targeted for sequential read, and the two logical volumes 346A and 346B are targeted for sequential write.

For that reason, the available I/O performance of 400 MB/s of the storage node 3A is prorated between read and write. It is assumed here that the necessary performance of read is equal to the necessary performance of write. The available I/O performance of read is prorated between the two logical volumes 345A and 345B, and the available I/O performance of write is prorated between the two logical volumes 346A and 346B. That is, the upper I/O performance limit for each of the logical volumes 345A, 345B, 346A, and 346B is set to 100 MB/s.

The available I/O performance of the storage node 3B is 100 MB/s. The storage node 3B reads data from one logical volume 345C and writes the retrieved data to the logical volume 346C. Further, in the case where the necessary performance of read is equal to the necessary performance of write, for example, the available I/O performance is prorated between read and write. Consequently, the available I/O performance of 50 MB/s of the storage node 3B is allocated to the logical volume 345C.

The management system 1 may determine the upper I/O performance limit for the copy destination volumes 346A, 346B, and 346C. The write throughput may be used instead of the above-mentioned read throughput as the I/O performance.

In another configuration example, the storage system may copy the data of a volume held in a storage node to a volume in another storage node of the production system. The management system 1 calculates an upper copy performance limit in a manner including the I/O operations stemming from the process of writing data to the copy destination storage node. For example, in the case where data is copied from a first storage node to a second storage node, the available I/O performance of the second storage node is calculated in addition to the available I/O performance of the first storage node. At the copy source node and at the copy destination node, minimum available I/O performance is selected.

For example, it is assumed that the copy destination volumes 346A and 346B are in a storage node different from the storage node 3A. It is also assumed that there are two copy destination volumes in the copy destination storage node and that the available I/O performance of these volumes is 200 MB/s. The sequential write throughput may be used as the available I/O performance, for example. The management system 1 allocates the upper I/O performance limit of 100 MB/s, derived from the proration of the available I/O performance of 200 MB/s of the copy destination storage node, to each of the copy destination volumes 346A and 346B. Since the upper I/O performance limit of each copy source volume is 200 MB/s, the upper I/O performance limit of the copy destination volumes is presented to the administrator.

In the case where the copy destination volume is to be duplicated for redundancy, the management system 1 may set the upper I/O performance limit for the volume or for the storage node in such a manner that the I/O load including the duplication does not exceed the available I/O performance of the storage node. In the case that a destination volume is duplicated for redundancy in a storage system, not only copy load applies to the storage node that holds a volume VOL 2 but also load applies to the storage node that holds a volume VOL 3 duplicating the copy destination volume VOL 2 for redundancy. The upper I/O performance limit is set in such a manner that the load does not exceed the available I/O performance of the storage node holding the volume VOL 2 and the available I/O performance of the storage node holding the volume VOL 3.

The load of the storage node at the redundancy destination varies depending on the redundancy method such as RAID 1 or RAID 5. In RAID 1, for example, the load stemming from access to the volume VOL 2 is approximately equivalent to the load resulting from access to the volume VOL 3.

In the example of FIG. 12, it is assumed that data is copied from the volume 346C in the storage node 3B further to a volume in another storage node, not depicted. In the storage node 3B, the upper limit of copy from the volume 346C to the other storage node mentioned above and the upper limit of copy from the volume 345C to the volume 346C are determined.

For example, given the available I/O performance of 100 MB/s of the storage node 3B, the performance of 50 MB/s is allocated to each of the volumes 345C and 346C. The upper I/O performance limit is also determined for the volume 346C as the copy destination volume according to the available I/O performance of the storage node that holds that volume.

Fourth Embodiment

Explained below is a fourth embodiment in which data is copied from volumes in a storage system that includes a plurality of storage nodes. In the fourth embodiment, a cloud migration tool is used suitably to migrate (copy) data of the production system in the on-premises environment to a cloud. The migration of data involves copying data from a migration source to a migration destination. The migration source storage system is the on-premises storage system, and the migration destination storage system is a cloud storage system.

The flowchart in FIG. 10 may be applied to the fourth embodiment. The method of calculating the upper I/O performance limit in the fourth embodiment is similar to the calculation method of the second embodiment. The difference from the second embodiment is the target for which the upper I/O performance limit is set in the fourth embodiment. In the second embodiment, the upper I/O performance limit is set for data copy by use of the backup tool; in the fourth embodiment, the upper I/O performance limit is set for data copy by use of a data migration tool.

As with the second embodiment, the fourth embodiment selects the smallest of the plurality of upper I/O performance limits.

Figure 13:
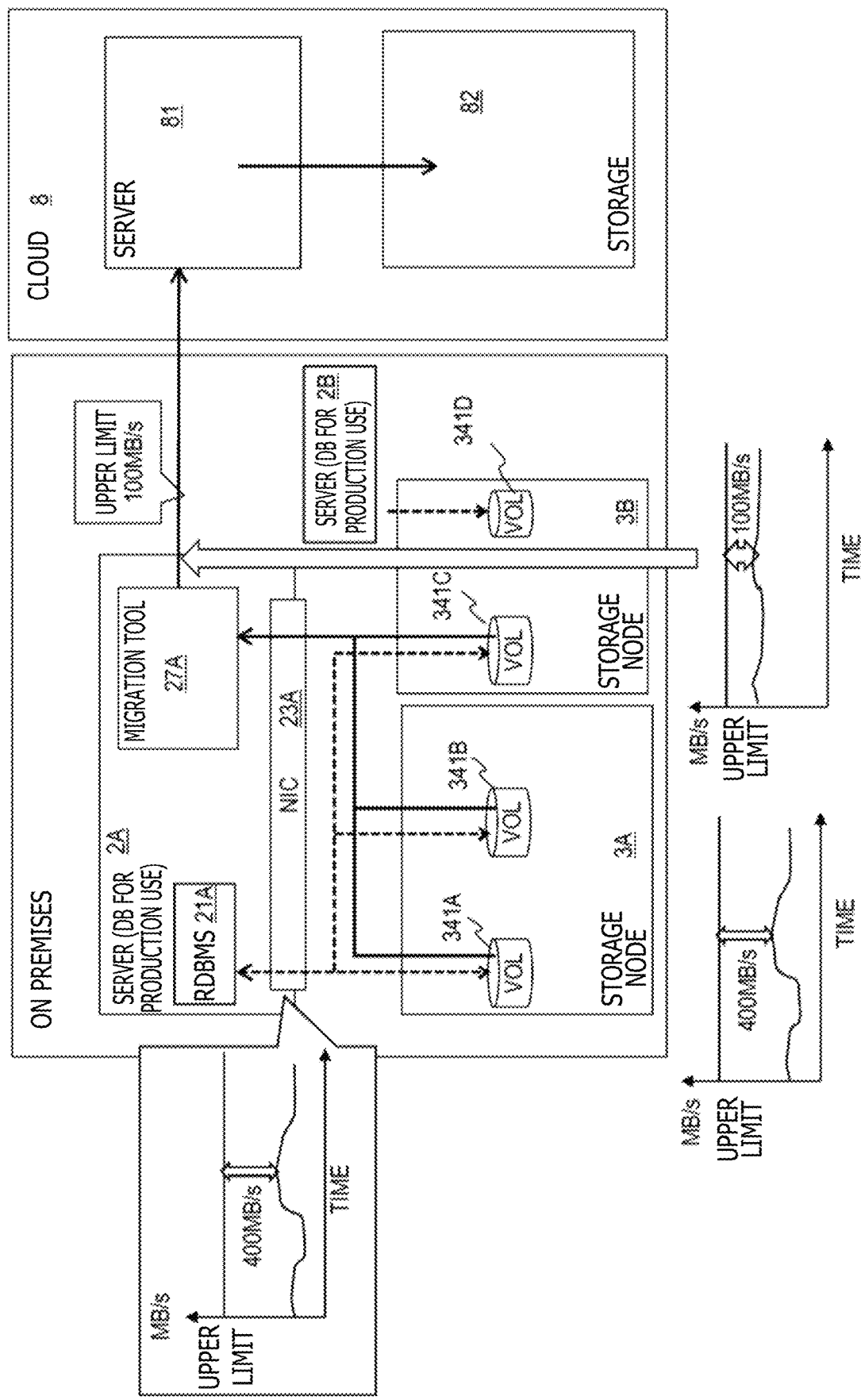
FIG. 13 is a diagram explaining how data copy is performed by another embodiment of the present specification.

FIG. 13 is a diagram explaining how data copy is performed by the fourth embodiment of the present specification. What follows is an explanation of the difference between the example of FIG. 11 and that of FIG. 13. The server 2A in FIG. 13 executes a migration tool 27A in place of the backup tool 24A in FIG. 11. The fourth embodiment involves copying data from logical volumes of the production system to a cloud 8 via a server by use of the migration tool 27A. The cloud 8 includes a server 81 and storage 82. The server 81 receives migration data from the server 2A and stores the received data into the storage 82.

The migration tool 27A controls the I/O limits on the storage system. The migration tool 27A controls data copy in units of servers under the upper I/O performance limit designated by the management system 1. The fourth embodiment determines the upper I/O performance limit of the storage system by using a calculation method similar to the method explained in conjunction with the second embodiment. That is, the management system 1 selects the smallest of the available I/O performance values of copy source volumes, for example. In so doing, the management system 1 may additionally reference the NIC of the server and the memory performance as discussed above. The data to be copied may be transmitted from the storage system to the cloud 8 without intervention of the server 2A.

Fifth Embodiment

What follows is an explanation of a fifth embodiment in which data is copied from volumes in a storage system that includes a plurality of storage nodes. In the fifth embodiment to be explained below, data is copied for migration between storage nodes. The fifth embodiment permits suitable execution of data copy between storage nodes without intervention of a server.

The flowchart in FIG. 10 may be applied to the fifth embodiment. The method of calculating the upper I/O performance limit in the fifth embodiment is similar to the calculation method of the first or second embodiment. The target for which the upper I/O performance limit is set in the fifth embodiment is different from that in the first embodiment. That is, the upper I/O performance limit is set in units of storage nodes or volumes. Alternatively, the smallest of the plurality of upper I/O performance limits may be selected.

Figure 14:
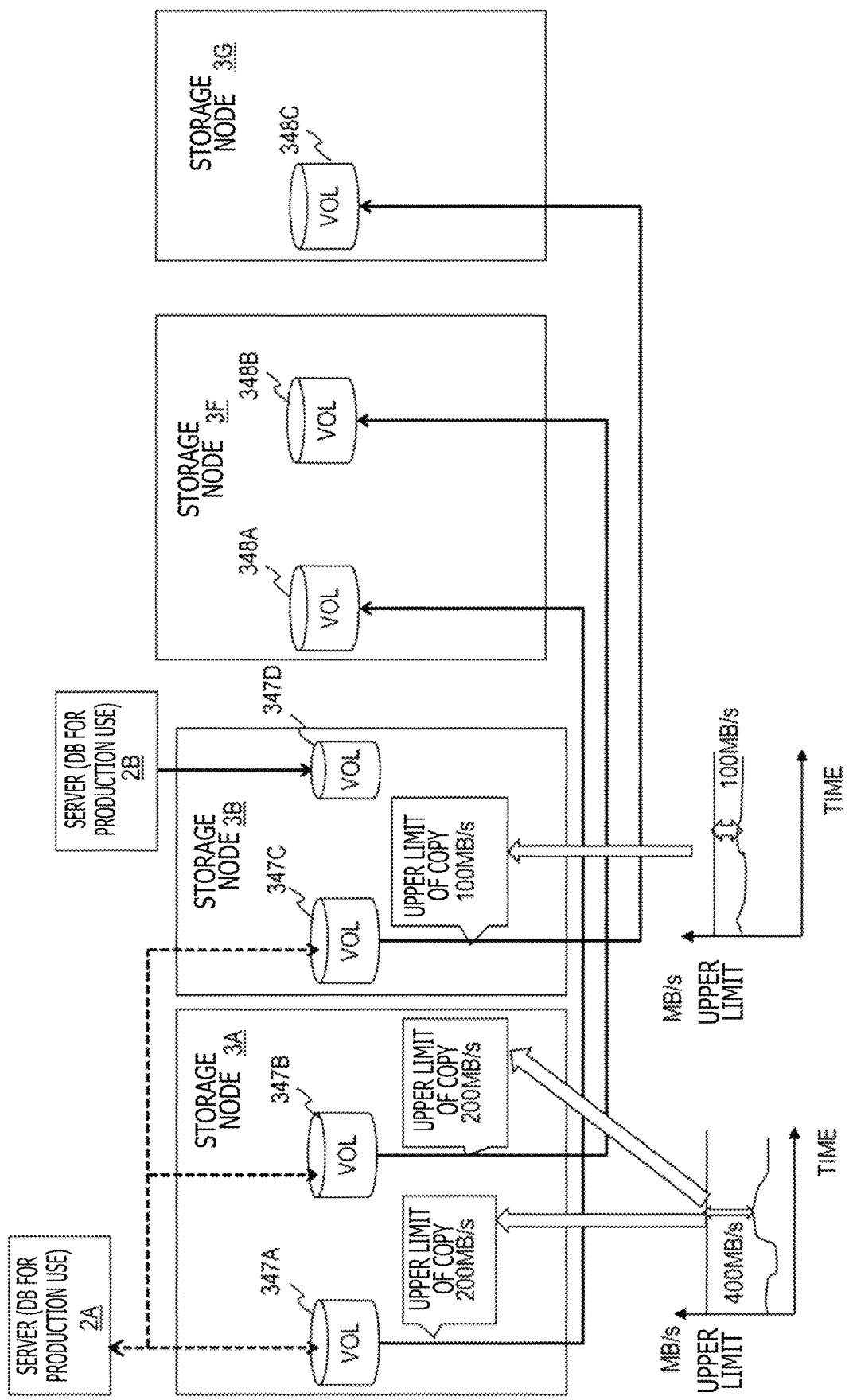
FIG. 14 is a diagram explaining how data copy is performed by another embodiment of the present specification.

FIG. 14 is a diagram explaining how data copy is performed by the fifth embodiment of the present specification. The storage node 3A holds logical volumes 347A and 347B. The storage node 3B holds logical volumes 347C and 347D. In the production environment, the server 2A gains access to the logical volumes 347A, 347B, and 347C. The server 2B accesses the logical volume 347D.

In the fifth embodiment, data is copied from the logical volumes 347A, 347B, and 347C of the production system to migration destination storage nodes 3F and 3G via a network between the storage nodes without intervention of a server. Specifically, the logical volumes 347A and 347B are copied to logical volumes 348A and 348B in the storage node 3F. The logical volume 347C is copied to a logical volume 348C in the storage node 3G.

The fifth embodiment determines the upper I/O performance limit of data copy for the logical volumes 347A, 347B, and 347C. In the exemplary configuration in FIG. 14, the migration destination storage nodes 3F and 3G are assumed to have sufficient available I/O performance. It is also assumed that the upper I/O performance limit can be set in units of volumes.

The management system 1 determines the upper I/O performance limit for data read from each of the copy source logical volumes 347A, 347B, and 347C. The upper limit of the throughput (MB/s) including read and write or the upper limit of the read throughput (MB/s) may be calculated as the upper I/O performance limit.

In the example of FIG. 14, the available I/O performance of the storage node 3A is 400 MB/s. The storage node 3A reads data from the two logical volumes 347A and 347B. The available I/O performance of 400 MB/s of the storage node 3A is prorated between the two logical volumes 347A and 347B. The upper I/O performance limit (upper copy performance limit) for each of the two logical volumes 347A and 347B is thus determined to be 200 MB/s.

The available I/O performance of the storage node 3B is 100 MB/s. The available I/O performance of 100 MB/s of the storage node 3B is allocated to the logical volume 347C. The upper I/O performance limit (upper copy performance limit) of the logical volume 347C is thus set to 100 MB/s.

The management system 1 may determine the upper I/O performance limit for the copy destination volumes 348A, 348B, and 348C. The I/O performance may be represented by the right throughput or by the throughput including read and write.

Alternatively, the upper I/O performance limit may be set not for each volume but for each storage node. As another alternative, the upper I/O performance limit may be set for a group of volumes linked to one application. In the latter case, the smallest of the upper I/O performance limits for the volumes in the volume group is determined to be the upper copy performance limit as in the second embodiment.

Sixth Embodiment

What follows is an explanation of a sixth embodiment in which data is copied from volumes in a storage system including a plurality of storage nodes. The major differences from the first embodiment are described below. The sixth embodiment involves creating a volume group. The management system 1 groups a plurality of volumes (logical volumes or snapshots), and determines the upper I/O performance limit for the entire group. This makes it possible to perform a suitable copy process in units of volume groups.

The management system 1 detects a combination of volumes that are targeted for copy, linked to one application, and arranged in the same storage node. The management system 1 puts the volumes of this combination into a group and, on the basis of the available I/O performance of each storage node, determines the upper I/O performance limit for the group. If the application is a database, what is grouped here are the volumes that hold the data of the same database and are arranged in the same storage node.

Figure 15:
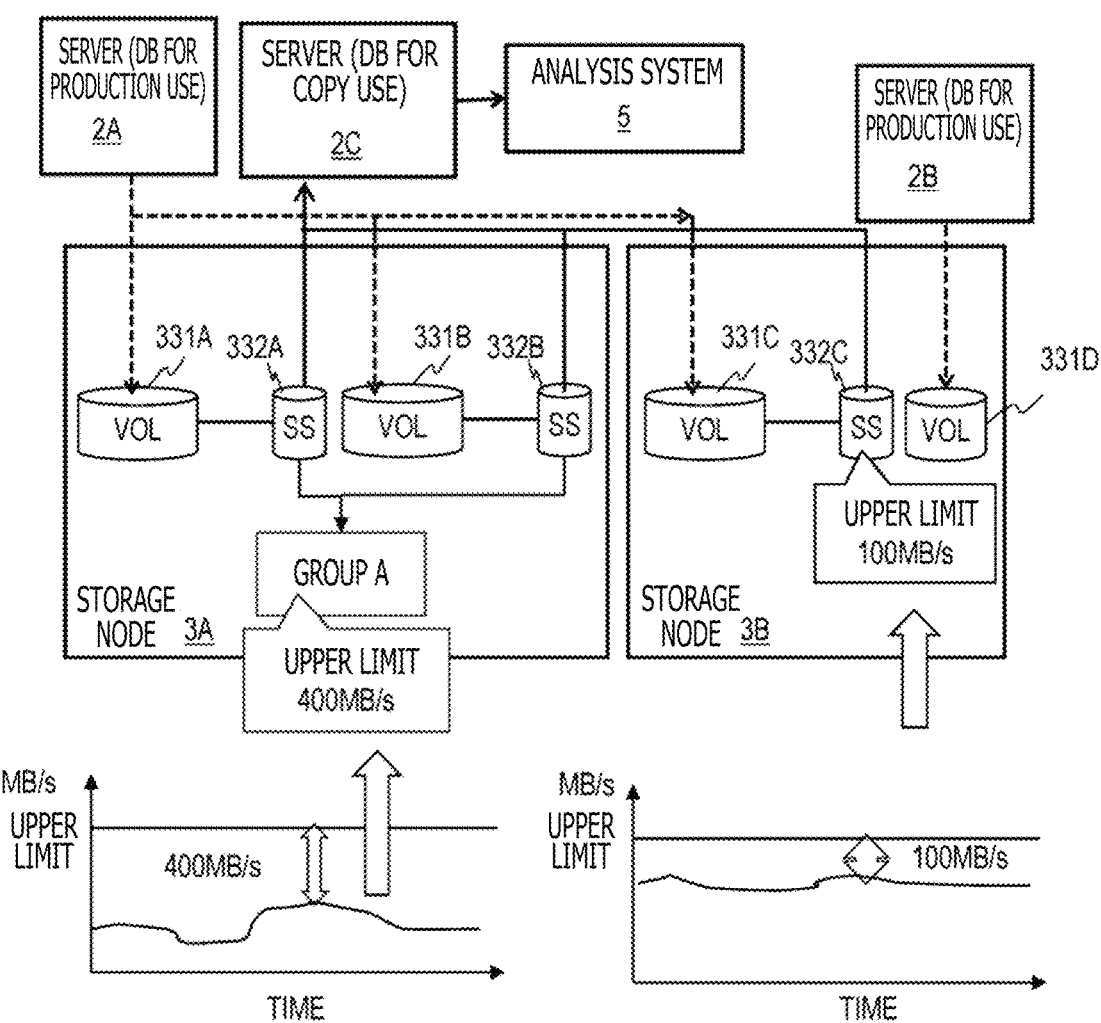
FIG. 15 depicts an example of how volumes are grouped.

FIG. 15 depicts an example of how volumes are grouped. In the storage node 3A, the logical volumes 331A and 331B are grouped, which entails grouping the snapshots 332A and 332B targeted for copy. For this group A, the available I/O performance of 400 MB/s of the storage node 3A is determined to be the upper limit. The management system 1 can obtain information for determining the group from the management target application server configuration information 240, the management target volume information 210, and the management target snapshot information 220.

Other Embodiments

In the case where a copy source volume is migrated to another storage node, the management system 1 may recalculate the upper I/O performance limit for that volume. The procedure of recalculating the upper I/O performance limit for the migration source node and for the migration destination node may be similar to the procedure of the above-described embodiments. The information regarding the volume migration source storage node and the volume migration destination storage node is included in the management information, not indicated, of the management system 1. In the exemplary configuration of the sixth embodiment, the volumes are also regrouped in the migration source storage node and in the migration destination storage node. The above-described embodiments are not limitative of the unit in which to express the I/O limits and of the values of the I/O limits. Preferably, IOPS values may be used.

The present invention is not limited to the embodiments discussed above and may be implemented in diverse variations and equivalents. For example, whereas the above-described embodiments give detailed and comprehensive explanations of this invention, the invention is not necessarily limited to any embodiment having all the configurations and components discussed above. The configuration of a given embodiment may be partially replaced by the configuration of another embodiment. The configuration of a given embodiment may be added to the configuration of another embodiment. Also, the configuration of each embodiment may be partially deleted or partially supplemented or replaced with the configuration of another embodiment.

The above-described structures, functions, processing parts, and other means may be implemented partially or entirely in hardware by design of integrated circuits, for example, or in software by a processor interpreting and executing relevant programs realizing the functions. The information such as programs, tables, and files for implementing the functions may be placed in storage apparatuses such as memories, hard disks, and solid-state drives (SSD) or on recording media such as integrated-circuit (IC) cards and secure-digital (SD) cards.

The control lines and information lines considered necessary for purpose of explanation are indicated in the drawings. The control lines and the information lines required for product implementation may not all be included. In practice, almost all structures may be considered to be connected with one another.

What is claimed is:

1. A management system for managing a storage system, comprising:
  at least one processor; and
  at least one storage apparatus,
  wherein the storage system includes a plurality of nodes,
  the at least one storage apparatus holds
    node performance information representing information regarding maximum performance of each of the plurality of nodes,
    volume information representing information regarding a volume provided by each of the plurality of nodes,
    monitoring information representing information regarding a load of each of the plurality of nodes, application information representing information regarding an application for accessing the volume, and data copy process information representing relations between the application and a data copy process, and the at least one processor references the data copy process information, the application information, and the volume information to identify a target node providing a target volume for the data copy process, determines an available input/output performance value of the target node on a basis of the node performance information and the monitoring information, determines an upper input/output performance limit of the data copy process on a basis of the available input/output performance value of the target node, and controls execution of the data copy process by the storage system according to the determined upper input/output performance limit, wherein the storage system performs the data copy process while enforcing the upper input/output performance limit to prevent exceeding the available input/output performance value of the target node.

2. The management system according to claim 1, wherein the at least one processor presents the upper input/output performance limit to a user.

3. The management system according to claim 1, wherein the at least one processor sets the upper input/output performance limit for the storage system.

4. The management system according to claim 1, wherein the at least one processor determines the upper input/output performance limit of the data copy process in units of volumes.

5. The management system according to claim 1, wherein the at least one processor determines the upper input/output performance limit of the data copy process.

6. The management system according to claim 1, wherein the at least one processor references the application information and the volume information to determine a group of volumes for a same application and for a same node, and determines the upper input/output performance limit of the data copy process in units of the groups.

7. The management system according to claim 1, wherein the at least one processor calculates, in the data copy process via a server executing the application, the available input/output performance value of the server, and, on a basis of the available input/output performance value of the target node and the available input/output performance value of the server, determines the upper input/output performance limit of the data copy process.

8. The management system according to claim 1, wherein the at least one processor calculates, in the data copy process on a copy destination node of the storage system, the available input/output performance value of the copy destination node on the basis of the node performance information and the monitoring information, and determines the upper input/output performance limit of the target node on a basis of the available input/output performance value of the target node and the available input/output performance value of the copy destination node.

9. The management system according to claim 1, wherein the at least one processor calculates, in the data copy process, the available input/output performance value of a node that holds a volume for duplicating the target volume for redundancy, the calculation being based on the node performance information and on the monitoring information, and determines the upper input/output performance limit of the target node on a basis of the available input/output performance value of the target node and the available input/output performance value of the node that holds the volume for duplicating the target volume for redundancy.

10. The management system according to claim 1, wherein the at least one processor calculates, in the data copy process on a copy destination node of the storage system, the available input/output performance value of a node that holds a volume for duplicating a copy destination volume for redundancy, the calculation being based on the node performance information and on the monitoring information, and determines the upper input/output performance limit of the copy destination node on a basis of the available input/output performance value of the node that holds the volume for duplicating the copy destination volume for redundancy.

11. The management system according to claim 1, wherein, after the data copy process for volume migration, the at least one processor recalculates the upper input/output performance limit of the data copy process for the target node and for a volume migration destination node.

12. A management method for a storage system using a management system, the storage system including a plurality of nodes, and the management system holding node performance information representing information regarding maximum performance of each of the plurality of nodes, volume information representing information regarding a volume provided by each of the plurality of nodes, monitoring information representing information regarding a load of each of the plurality of nodes, application information representing information regarding an application for accessing the volume, and data copy process information representing relations between the application and a data copy process, the management method comprising:

causing the management system to reference the data copy process information, the application information, and the volume information to identify a target node providing a target volume for the data copy process;

causing the management system to determine an available input/output performance value of the target node on a basis of the node performance information and the monitoring information;

causing the management system to determine an upper input/output performance limit of the data copy process on a basis of the available input/output performance value of the target node;

causing the management system to control execution of the data copy process by the storage system according to the determined upper input/output performance limit; and causing the storage system to perform the data copy process while enforcing the upper input/output performance limit to prevent exceeding the available input/output performance value of the target node.

13. The management system according to claim 1, wherein the at least one processor calculates the available input/output performance value by subtracting a predicted load of the target node over a predetermined time period from a maximum performance value of the target node obtained from the node performance information.

14. The management system according to claim 13, wherein the predicted load is determined based on historical monitoring information comprising at least one of a maximum value over a past period, 90 percent of the maximum value, an average plus standard deviation, or an average plus two times standard deviation.

15. The management system according to claim 1, wherein the data copy process comprises at least one of copying data from a snapshot volume for secondary use, copying data for backup purposes, copying data within the storage system, or migrating data between storage nodes.

16. The management system according to claim 1, wherein the at least one processor prorates the available input/output performance value of the target node among multiple volumes on the target node that are targeted for the data copy process.

17. The management system according to claim 1, wherein the upper input/output performance limit is expressed as at least one of throughput in megabytes per second, input/output operations per second, or a combination of read throughput and write throughput.

* * * * *